United States Patent
George

(10) Patent No.: US 10,462,128 B2
(45) Date of Patent: *Oct. 29, 2019

(54) VERIFICATION OF BOTH IDENTIFICATION AND PRESENCE OF OBJECTS OVER A NETWORK

(71) Applicant: Michael Arthur George, Ivybridge (GB)

(72) Inventor: Michael Arthur George, Ivybridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/110,680

(22) Filed: Aug. 23, 2018

(65) Prior Publication Data

US 2019/0014107 A1    Jan. 10, 2019

Related U.S. Application Data

(63) Continuation-in-part of application No. 15/727,344, filed on Oct. 6, 2017, now Pat. No. 10,102,364.

(60) Provisional application No. 62/406,898, filed on Oct. 11, 2016.

(51) Int. Cl.
| | |
|---|---|
| *H04L 29/08* | (2006.01) |
| *H04L 29/06* | (2006.01) |
| *H04B 5/00* | (2006.01) |
| *H04W 12/08* | (2009.01) |

(52) U.S. Cl.
CPC ....... *H04L 63/0838* (2013.01); *H04B 5/0031* (2013.01); *H04L 63/0876* (2013.01); *H04L 67/146* (2013.01); *H04L 69/16* (2013.01); *H04W 12/08* (2013.01)

(58) Field of Classification Search
USPC ........... 726/2, 4, 21, 36; 713/150, 163, 181; 380/255, 264, 276
See application file for complete search history.

(56) References Cited

U.S. PATENT DOCUMENTS

| | | | |
|---|---|---|---|
| 9,032,498 B1* | 5/2015 | Ben Ayed | G06F 21/35 726/9 |
| 2016/0321654 A1* | 11/2016 | Lesavich | G06F 21/6245 |
| 2016/0330172 A1* | 11/2016 | Muttik | H04L 63/0281 |
| 2017/0017947 A1* | 1/2017 | Robinton | G06Q 20/209 |
| 2017/0270323 A1* | 9/2017 | Butler | G06K 7/0008 |
| 2017/0374070 A1* | 12/2017 | Shah | H04L 63/20 |
| 2018/0009417 A1* | 1/2018 | Hoyos | H05K 999/99 |

* cited by examiner

*Primary Examiner* — Sharif E Ullah
(74) *Attorney, Agent, or Firm* — Mark Terry

(57) ABSTRACT

A method and system for verifying both identification and presence of an object is provided. The system includes an identification tag containing data associated with an object, a reader for reading said data from the identification tag, communicating data received from the identification tag to the server, and a server configured for receiving the data sent by the reader, accessing an object record that corresponds to the object, determining whether the data it received is verified against data in the object record, and if said data is verified, then generating a URL and transmitting said URL to the reader over the communications network, wherein said URL includes a verification message.

5 Claims, 6 Drawing Sheets

VERIFICATION OF BOTH IDENTIFICATION AND PRESENCE OF OBJECTS OVER A NETWORK

CROSS-REFERENCE TO RELATED APPLICATIONS

This patent application is a continuation in part of patent application Ser. No. 15/727,344 filed on Oct. 6, 2017 entitled "Verification of Both Identification and Presence Over a Network.", which claims priority to provisional application No. 62/406,898 filed on Oct. 11, 2016 entitled "Identification and Presence Verification Over a Network." The subject matter of provisional application No. 62/406,898 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to computer or information security and, more specifically, to processes for improving the verification of identification and presence.

BACKGROUND

Computer or information security, otherwise known as cyber-security, has become an increasingly important aspect of everyday life. Worldwide spending on information security reached 75 billion in 2015, and the global information security market is expected to grow to 170 billion by 2020. Although there have been myriad of advancements in the field, however, there is a shortage of solutions in the field of identification and presence verification.

With regard to presence and identification verification, the presence and identification of a location or object is often verified via the use of a location beacon or device that holds or emits a unique set of data that corresponds to a location or object. For example, one well-known security guard system includes beacons affixed to specific locations along the route taken by the security guard, wherein each location beacon emits data unique to its location, so as to ensure that the security has actually visited said locations. This solution, however, has the disadvantage of being easily circumvented by copying the data that is held or emitted from the location beacon or device. Another method of circumventing this system involves physically moving the location beacons to reduce the distance that must be travelled by the security guard. In another example, a location beacon may be altered or modified in order to appear as if it is located in the proper place. These circumventing measures provide opportunities for individuals to manipulate conventional identification and presence verification systems.

Therefore, a need exists for improvements over the prior art, and more particularly for improved methods and systems for verifying both identification and presence.

SUMMARY

A method and system for verifying both identification and presence of an object is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the system includes an identification tag associated with an object, the identification tag comprising: a) an embedded integrated circuit configured for generating a one-time-password (OTP) upon each use of the identification tag, and b) non-volatile memory for storing a unique identifier, and a uniform resource locator (URL); a reader comprising: a) a Near Field Communication (NFC) sub-system that reads data from the identification tag using radio frequency signals; b) a global navigation satellite system (GNSS) sub-system; c) a network connection device communicatively coupled with a communications network; and d) a processor configured for: 1) reading the following data from the identification tag: the unique identifier, the OTP, and the URL; 2) reading a current geographical location from the GNSS sub-system; and 3) transmitting the unique identifier, the OTP, a current time stamp and the current geographical location to a server identified by the URL by sending a TCP/IP communication over the communications network, 4) responsive to sending the TCP/IP communication, receiving, over the communications network, a second URL, 5) sending another TCP/IP communication over the communications network to the server identified by the second URL, and 6) displaying data received from the second URL, wherein said data includes a verification message; a database including one or more object records, wherein each object record includes a unique identifier; a server comprising a network connection device communicatively coupled with a communications network, and a processor configured for: 1) receiving the unique identifier, the OTP, the current time stamp and the current geographical location from the reader via the communications network; 2) accessing an object record in the database that corresponds to the unique identifier, and logging the unique identifier, the OTP, the current time stamp and the current geographical location in association with the object record; 3) determining whether the unique identifier and the OTP are verified against the unique identifier in the object record; and 4) if said unique identifier and the OTP are verified, then generating a new URL and transmitting said new URL to the reader over the communications network, wherein said URL includes a verification message.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
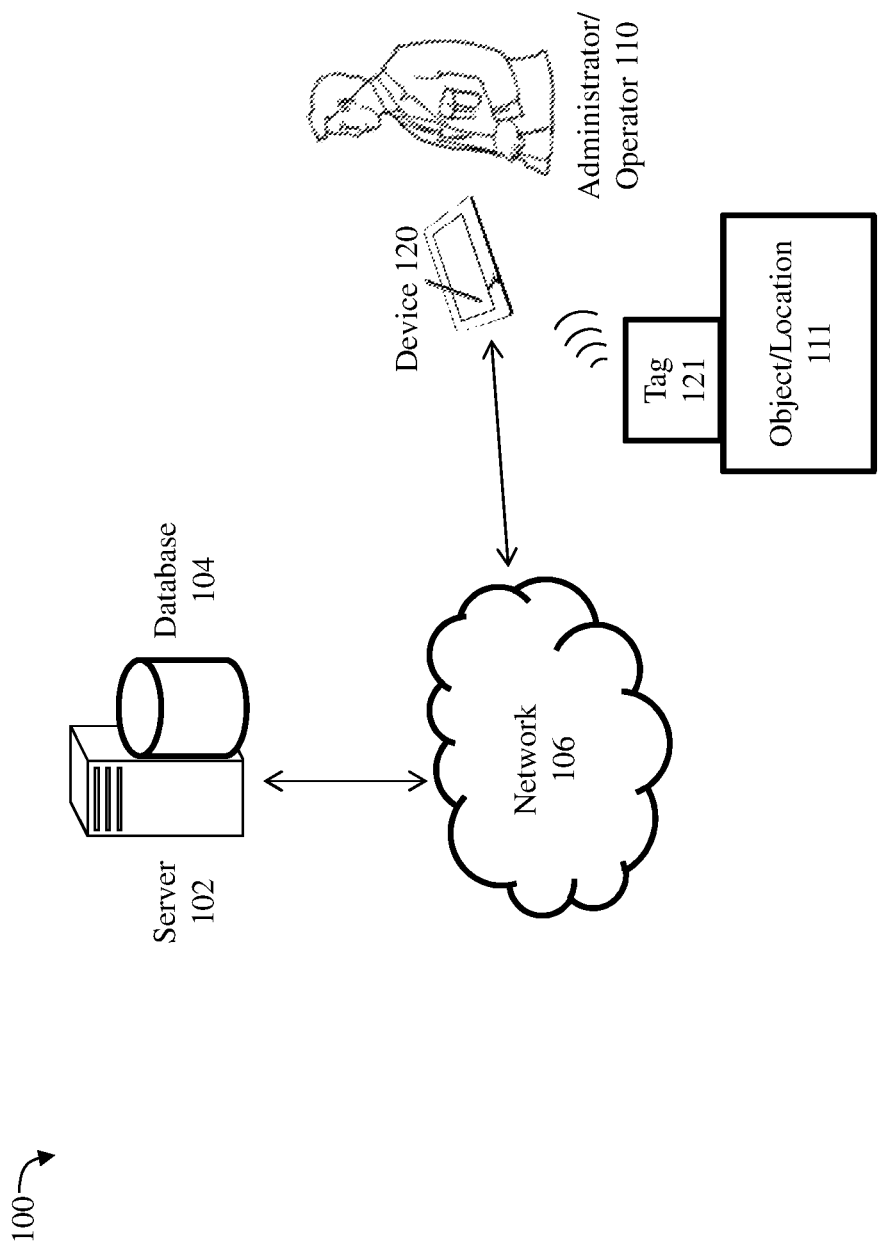
FIG. 1 is a diagram of an operating environment that supports a method and system for verifying both identification and presence of a location or object, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a simple, cost-effective and user-friendly method for verifying both presence and identification a location or object. The claimed subject matter reduces or eliminates the possibility that an identification tag can be stolen or copied, and used on another object or different location, since the system checks the actual location of the identification tag. Also, the claimed subject matter also excludes the possibility that the identification tag may be altered or modified, since the identification tag must be able to produce a one-time-password that is verified by a remote server. Therefore, the claimed subject matter reduces or eliminates opportunities for unauthorized users to manipulate the claimed system. Further, the claimed subject matter does not use location beacons, thereby eliminating the possibility of circumventing measures for manipulating the claimed system.

FIG. 1 is a diagram of an operating environment 100 that supports a method and system for verifying both identification and presence of a location or object. The server or computing device 102 may be communicatively coupled with a communications network 106, according to an example embodiment. The environment 100 may comprise mobile computing device 120, which may communicate with computing device 102 via a communications network 106. Mobile computing device 120 may comprise a cellular/mobile telephone, smart phone, tablet computer, laptop computer, handheld computer, desktop computer, wearable computer, or the like. Device 120 may also comprise other computing devices such as desktop computers, workstations, servers, and game consoles, for example. The mobile computing device 120 may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

FIG. 1 also shows an object or location 111. An object may be any tangible thing to which an identification tag 121 may be affixed, such as an automobile, a computer, a book, a piece of jewelry, a piece of equipment, a desk, a file drawer, or the like. A location may be an office, a building, a room, a structure, an edifice, a street, a wall or the like. At a location, the identification tag may be affixed to a wall, a floor, a door, a pole, or the like.

FIG. 1 also shows an identification device or tag 121, which may be a near field communication (NFC) tag that emits radio frequency signals that comport with the ISO/IEC 18092 and ECMA 340 communications protocol standards. Tag 121 may also be implanted in a mobile computing device that includes an NFC sub-system, onboard processor or separate processor. Tag 121 may also be an RFID tag that comports with ISO/IEC 15693, 14443, 14223, 18000, and 21481 communications protocol standards. Tag 121 may also include encryption and authentication standards such as those described in ISO/IEC 18000, 29167 and ISO/IEC 20248. In another embodiment, the tag 121 may be a small planar element that includes a legible unique identifier and may include a variety of other information about the location or object, such as: name, address, global position, a photograph of the location or object and a unique identifier. In yet another embodiment, the tag 121 may be a smart card, chip card, or integrated circuit card (ICC), which is a pocket-sized card that includes non-volatile memory for storing data (such as a unique identifier, and a uniform resource locator) and an embedded integrated circuit for delivering stored data, such as generating a one-time-password (OTP). The tag 121 may also store additional data about a location or object, such as any of the data in the object record, described more fully below.

The environment 100 shows that mobile computing device 120 is operated by an administrator or operator 110. Server 102, tag 121 and device 120 may each comprise a computing device 600, described below in greater detail with respect to FIG. 6.

In another embodiment, the device 120 may also calculate current geographical position (otherwise referred to as geographical location data) using a sub-system, an on-board processor or a connected processor. In one embodiment, the device 120 may calculate current position using a satellite or ground based positioning system, such as a Global Positioning System (GPS) system, which is a navigation device that receives satellite or land-based signals for the purpose of determining the device's current geographical position on Earth. Generally, device 120 calculates global navigation satellite system (GNSS) data. A GNSS or GPS receiver, and its accompanying processor, may calculate latitude, longitude and altitude information. In this document, the terms GNSS and GPS are used generally to refer to any global navigation satellite system, such as GLONASS, GALILEO, GPS, etc. In this embodiment, a radio frequency signal is received from a satellite or ground based transmitter comprising a time the signal was transmitted and a position of the transmitter. Subsequently, the device 120 calculates current geographical location data of the device based on the signal. In another embodiment, the device 120 calculates current geographical location using alternative services, such as control plan locating, GSM localization, dead reckoning, or any combination of the aforementioned position services. The term spatial technologies or spatial processes refers generally to any processes and systems for determining one's position using radio signals received from various sources, including satellite sources, land-based sources and the like.

Computing device 102 includes a software engine that delivers applications, data, program code and other information to networked devices, such as 120. The software engine of device 102 may perform other processes such as transferring multimedia data in a stream of packets that are interpreted and rendered by a software application as the packets arrive. FIG. 1 further shows that device 102 includes a database or repository 104, which may be a relational database comprising a Structured Query Language (SQL) database stored in a SQL server. Mobile computing device 120 may also include their own database, either locally or via the cloud. The database 104 may serve object or location identifying data, as well as related information from a corresponding object record (located in database 104), which may be used by device 102 and mobile computing device 120.

Device 102, mobile computing device 120 and tag 121 may each include program logic comprising computer source code, scripting language code or interpreted language code that perform various functions of the disclosed embodiments. In one embodiment, the aforementioned program logic may comprise program module 607 in FIG. 6. It should be noted that although FIG. 1 shows only one mobile computing device 120, one tag 121 and one server 102, the system of the disclosed embodiments supports any number of servers, tags and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

The database 104 may include an object or location record for each object or location 111. An object or location record may include: identifying information for the location or object (name, address, global position, zip code, etc.), a handle for the object or location, a unique identifier, a photograph of the location or object, a password or other authentication key for the location or object, information pertaining to permissions attributed to the location or object, information pertaining to previous visits made at the location or object, a description of past changes to the object or location record, the identity of the source of permissions received by the location or object, the identity of the receiver of permissions granted by the location or object, etc. An object or location record may further include additional data, such as neighborhood name, type of object or location, serial number, etc. An object or location record may further include a UPC code or a QR code corresponding to the object or location.

An object or location record may also include a one-time-password (OTP) generation identifier. A one-time password (OTP) is a password that is valid for only one login session or transaction. OTPs avoid shortcomings that are associated with traditional (static) password-based authentication, such as replay attacks (i.e., when an intruder records an OTP that was already used to log into a service) and instances where the same password is used for multiple systems (i.e., if the password for one system is gained, all said systems are not made vulnerable). Various methods are well known in the art for generating an OTP, such as time-synchronized generation of an OTP (which uses hardware called a security token) and mathematical algorithms that use a seed and a hash function. A one-time-password (OTP) generation identifier is simply a unique identifier that identifies the method of generating an OTP used in a particular instance.

Figure 4:
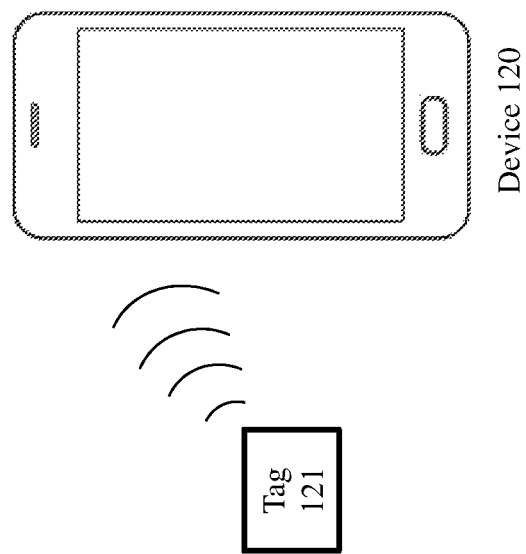
FIG. 4 is an illustration of a reader and identification tag used in the method and system for verifying both identification and presence of a location or object, according to an example embodiment.

Environment 100 may be used when administrator or operator 110 attempts to verify the identification or presence of an object or location 111 using the identification tag 121. The operator 110 uses his device 120 to verify the identification or presence of an object or location 111. FIG. 4, for example, shows how the operator 110 may be a commercially available smart phone 120 to access information from the tag 121 using radio frequency, such as the NFC communication protocol standard.

Figure 2:
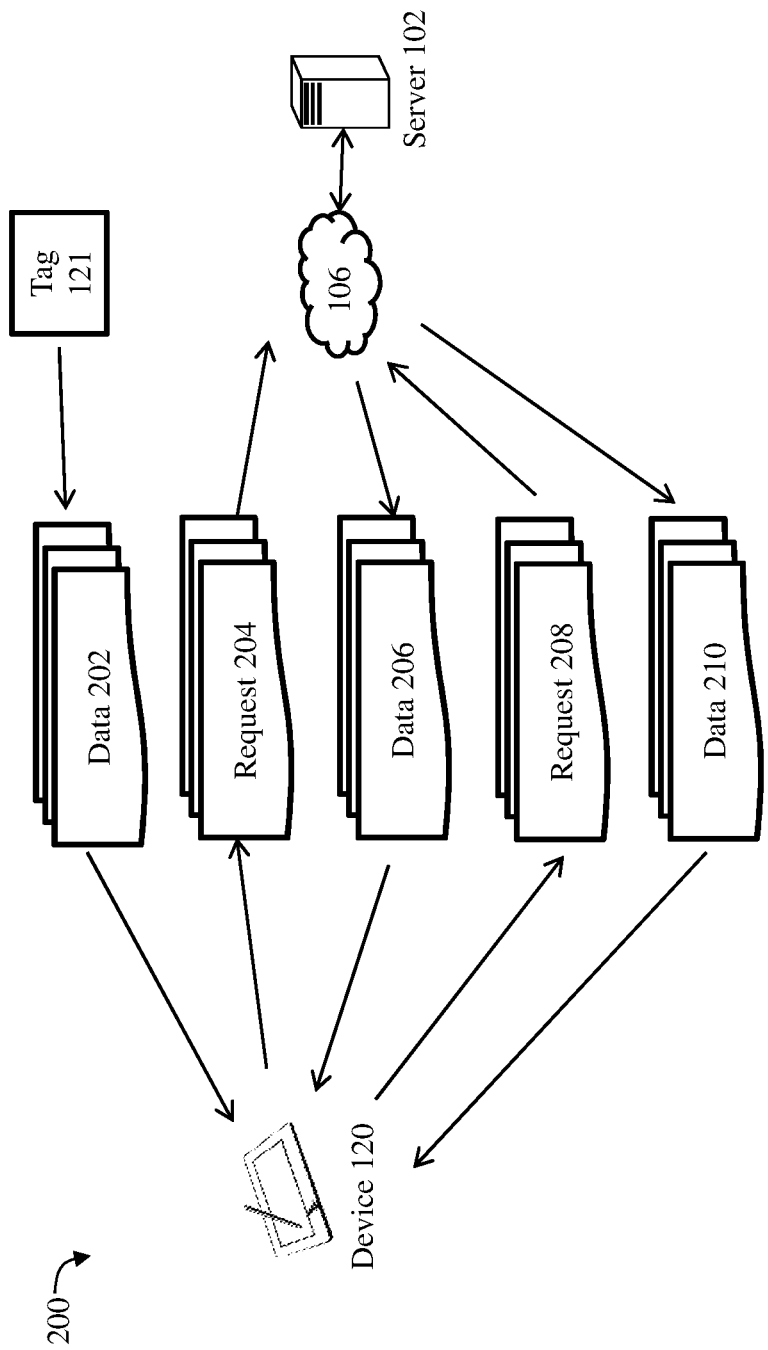
FIG. 2 is a diagram showing the data flow of a method and system for verifying both identification and presence of a location or object, according to an example embodiment.
Figure 3:
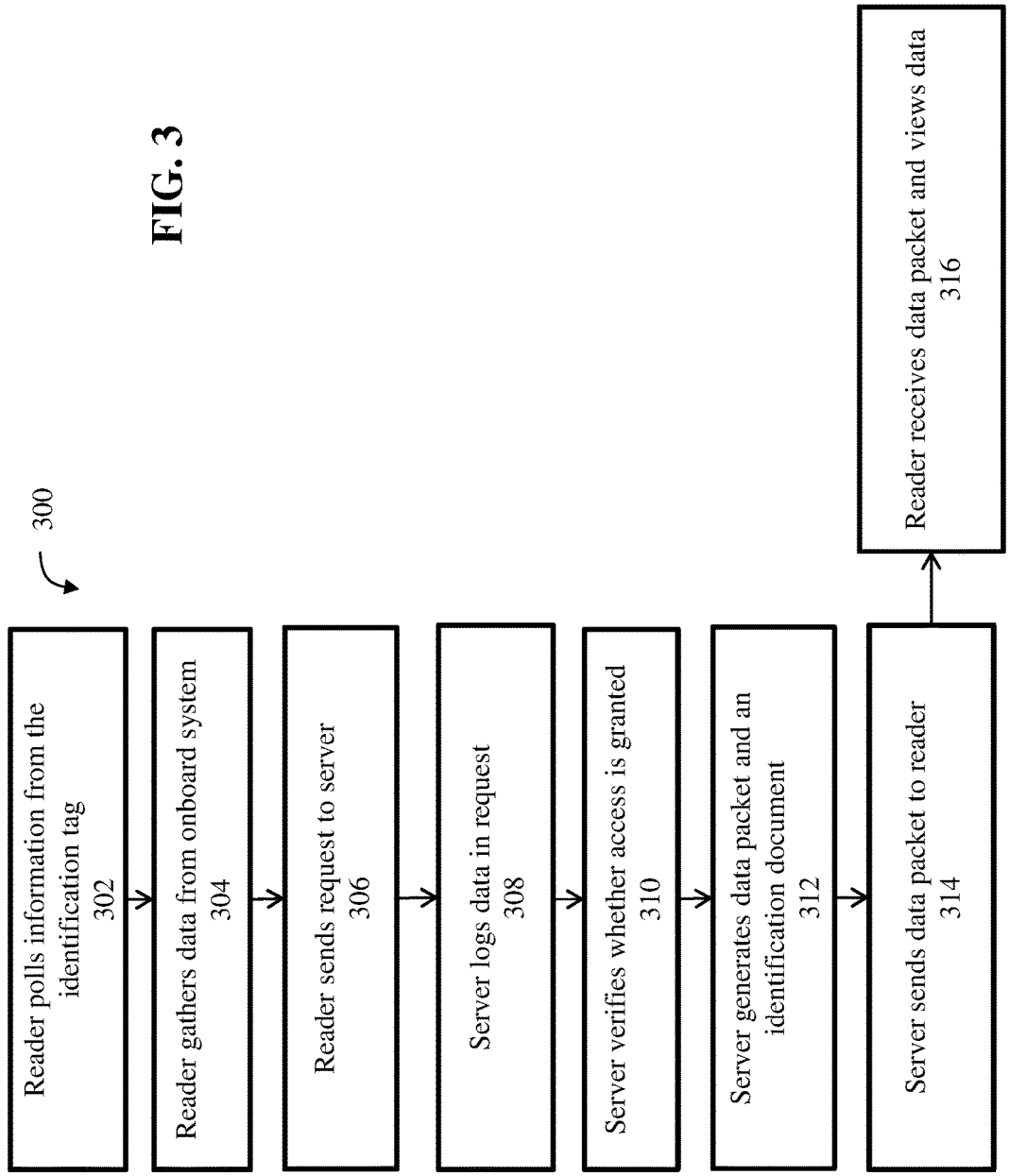
FIG. 3 is a flowchart showing the control flow of the method and system for verifying both identification and presence of a location or object, according to an example embodiment.
Figure 5:
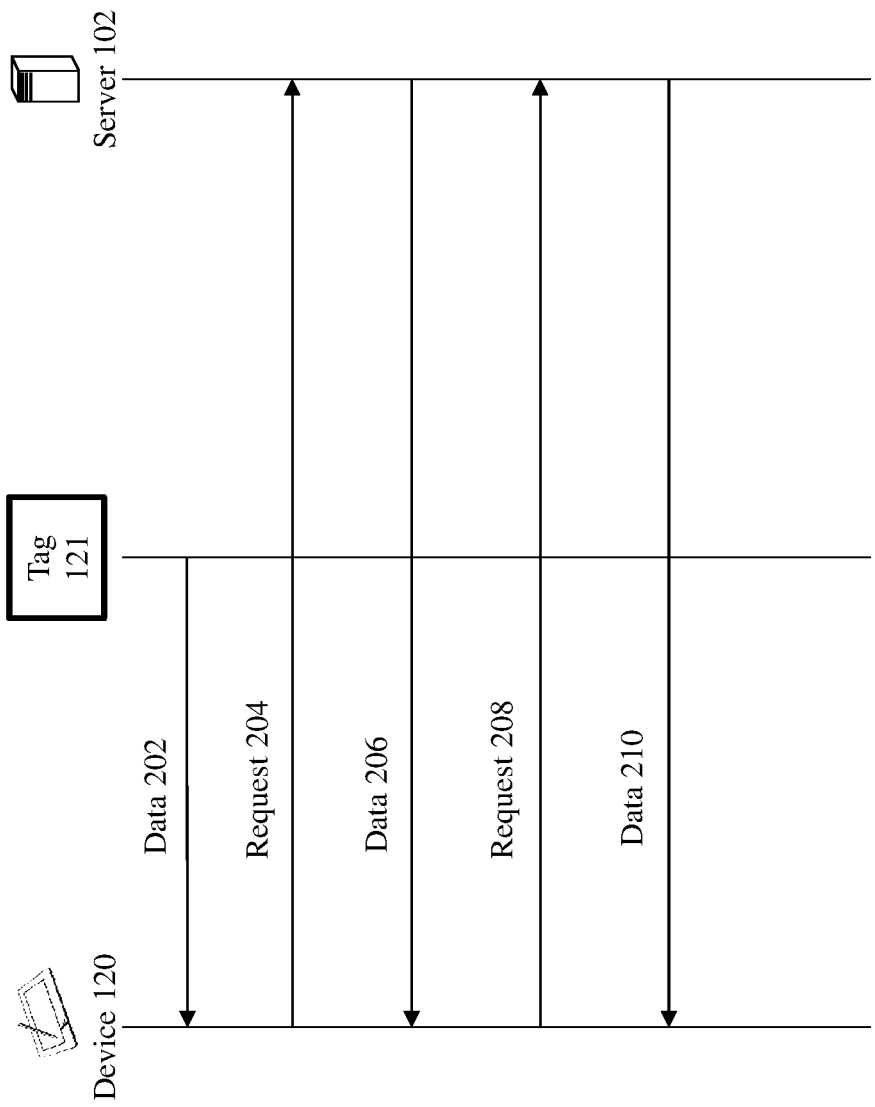
FIG. 5 is a diagram showing various calls for data used in the method and system for verifying both identification and presence of a location or object, according to an example embodiment.

The method and system for verifying an identification tag and presence of an object or location is described in more detail below, with reference to FIGS. 2, 3 and 5. The process of verifying an identification tag and presence of an object or location beings with step 302 of FIG. 3. In step 302, the operator 110 utilizes his device 120 to read data 202 (see FIGS. 2 and 5) from the tag 121. The processor of the device 120 is configured for reading data 202 from the identification tag 121, wherein the data 202 includes at least a unique identifier, a one-time password, and a data packet, which may include an address for a server, such as a universal resource location (URL). Data 202 may also include a photograph of the object or location.

Next, in step 304, the reader device 120, reads a current geographical location from the GNSS sub-system (such as latitude and longitude data) and a current time from its internal timekeeping processes. In this step, in one option, some or all of the data read by device 120 is displayed on device 120. This may include, for example, displaying a photograph of the object or location 111, such that the operator 110 may verify that the object or location associated with tag 121 matches the data displayed.

In step 306, the device 120 transmits a request 204 to the server 102 identified in the data packet. The server may be identified by an address such as a URL. The request 204 may include the unique identifier, the OTP, a current time stamp and the current geographical location. The device 120 may transmit the request 204 by sending a TCP/IP communication over the communications network 106 to the server 102 that was identified. One method of accomplishing this step is to activate a web browser to navigate to the URL that was read in step 302. The device 120 may further transmit additional data it read in steps 302-304 (such as the unique identifier, the one-time password, a time stamp and the current geographical location) to the server 102 over the communications network 106 in the same step 306. In one embodiment, the device 120 may transmit data to the server 102 in step 306 by embedding said data in a Hyper Text Transfer Protocol (HTTP) request 204 (see FIGS. 2 and 5) that is sent to the server 102, when the device 120 uses the address or URL that was read in step 302.

The TCP/IP suite is the conceptual model and set of communications protocols used on the Internet and similar computer networks. The protocols in the suite are the Transmission Control Protocol (TCP) and the Internet Protocol (IP). The TCP/IP suite provides end-to-end data communication specifying how data should be packetized, addressed, transmitted, routed, and received. A TCP/IP communication is a message or packet of information that is transmitted using the TCP/IP suite.

In step 308, server 102 receives request 204 (which may include the unique identifier, the one-time password, a time stamp and the current geographical location from the device 120) via the communications network 106 and logs the data it received in association with an object record in the attached database 104, wherein the object record corresponds to the unique identifier. Next, in step 310, the server 102 accesses the object record in the database 104 that corresponds to the unique identifier and determines whether the unique identifier and the OTP received from device 120 are verified against the unique identifier and the OTP generation scheme identifier in the object record. In step 310, the server 102 may also read additional data from the object record, such as an image of the object or location.

In step 312, if said unique identifier and the OTP are verified against the unique identifier and the OTP generation scheme identifier in the object record, then the server 102 generates a new data packet and, in step 314, transmits said new data packet (i.e., data 206) to the reader over the communications network. The new data packet (data 206) may include a second address for a server (which may or may not be the same as server 102), wherein the second address may also be a URL. The second address may contain a verification message. In one embodiment wherein the second address is a URL, a web page located at said URL includes a verification message.

Also, in step 312, the server 102 generates an identification document (such as a data packet, a web page, a PDF file, etc.) corresponding to said second address or URL in data 206, which said identification document includes a verification message. The identification document corresponding to said second address or URL in data 206 may also include other data read from the object record, such as an image of the object or location.

If said unique identifier and the OTP are not verified against the unique identifier and the OTP generation scheme identifier in the object record, then in step 312 the server 102 generates an alternate data packet and, in step 314, transmits said alternate data packet (i.e., data 206) to the reader over the communications network. The alternate data packet may include an alternate address, such as an alternate URL, wherein an identification document located at said alternate address or alternate URL includes a denial message. Also, in step 312, the server 102 generates an identification document corresponding to said alternate address in data 206, in which said identification document includes said denial message.

In step 316, the reader device 120 receives the data packet embedded in data 206 and sends another TCP/IP communication over the communications network to the server 102 identified by the address in the data packet. One method of accomplishing this task is to activate a web browser to navigate to a URL in the data packet. In step 316, the device 120 may navigate to said URL by sending an HTTP request 208 to server 102. In response to said request 208, the server 102 sends data 210 to reader device 120, which said data 210 comprises the identification document generated by the server 102 in step 312. If the object or location was verified against the data in the object record, then the identification document includes a verification message, such as a textual indicium of approval. The identification document may also include other data read from the object record, such as an image of the object or location. If the object or location was not verified against the data in the object record, then the identification document includes a denial message, such as a textual indicium that approval is denied. In response, the operator 110 may proceed accordingly.

In one alternative to steps 312-316, in step 312, if said unique identifier and the OTP are verified against the unique identifier and the OTP generation scheme identifier in the object record, then the server 102 generates a first data packet and, in step 314, transmits said first data packet (i.e., data 206) to the reader over the communications network, wherein the data packet includes a verification message. The data packet may also include other data read from the object record, such as an image of the object or location. If said unique identifier and the OTP is not verified against the unique identifier and the OTP generation scheme identifier in the object record, then in step 312 the server 102 generates a second data packet and, in step 314, transmits said second data packet (i.e., data 206) to the reader over the communications network, wherein the data packet includes a denial message. In step 316, the reader device 120 receives the data packet sent in data 206 and displays the data in the data packet. If the object or location was verified against the data in the object record, then the data packet includes a verification message, such as a textual indicium of approval. If the object or location was not verified against the data in the object record, then the data packet includes a denial message, such as a textual indicium that approval is denied. In response, the operator 110 may proceed accordingly. A data packet may include a network packet, IP packet, or a file, such as a JSON file or an XML file, among other things.

Figure 6:
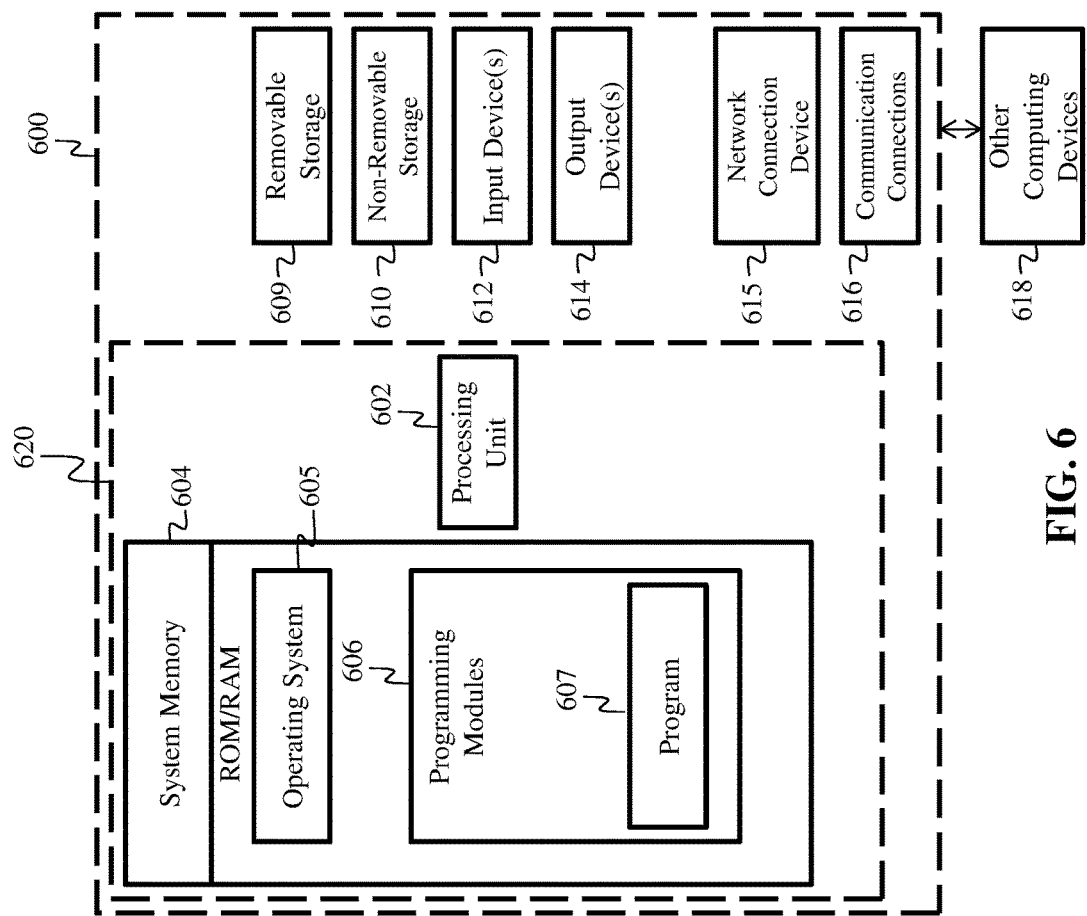
FIG. 6 is a block diagram of a computing device used with the example embodiments.

FIG. 6 is a block diagram of a system including an example computing device 600 and other computing devices. Consistent with the embodiments described herein, the aforementioned actions performed by device 102, device 120, tag 121 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and processes 200, 300, as described above. Processes 200, 300 may operate in other environments and are not limited to computing device 600.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of device 102, device 120, tag 121. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 600. Any such computer storage media may be part of device 600.

Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the processes 200 and 300 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for verifying both identification and presence of an object, the system comprising:
   an identification tag associated with a single object, the identification tag comprising: a) an embedded integrated circuit that generates a one-time-password (OTP) upon each use of the identification tag, and b) non-volatile memory that stores a unique identifier, and a uniform resource locator (URL);
   a reader comprising a mobile computing device including:
     a) a Near Field Communication (NFC) sub-system that reads data from the identification tag using radio frequency signals; b) a global navigation satellite system (GNSS) sub-system; c) a network connection device communicatively coupled with a communications network; and d) a processor that:
       1) reads the following data from the identification tag: the unique identifier, the OTP, and the URL;
       2) reads a current geographical location from the GNSS sub-system; and
       3) transmits the unique identifier, the OTP, a current time stamp and the current geographical location to a server identified by the URL by sending a TCP/IP communication over the communications network;
       4) responsive to sending the TCP/IP communication, receiving, over the communications network, a second URL;

5) sending another TCP/IP communication over the communications network to the server identified by the second URL; and
6) displaying data received from the second URL, wherein said data includes a verification message;

a database including one or more object records, wherein each object record includes a unique identifier for a specific object;

the server comprising a network connection device communicatively coupled with a communications network, and a processor that:
1) receives the unique identifier, the OTP, the current time stamp and the current geographical location from the reader via the communications network;
2) accesses an object record in the database that corresponds to the unique identifier, and logs the unique identifier, the OTP, the current time stamp and the current geographical location in association with the object record;
3) determines whether the unique identifier and the OTP are verified against the unique identifier in the object record; and
4) if said unique identifier and the OTP are verified, then generates the second URL and transmits said second URL to the reader over the communications network, wherein a web page located at the second URL includes a verification message.

2. The system of claim 1, wherein the global navigation satellite system (GNSS) sub-system is a global positioning system (GPS) sub-system.

3. A system for verifying both identification and presence of an object, the system comprising:
an identification tag associated with a single object, the identification tag comprising: a) an embedded integrated circuit that generates a one-time-password (OTP) upon each use of the identification tag, and b) non-volatile memory that stores a unique identifier, and a data packet including an address;
a reader comprising a mobile computing device including: a) a Near Field Communication (NFC) sub-system that reads data from the identification tag using radio frequency signals; b) a network connection device communicatively coupled with a communications network; and c) a processor that:
1) reads the following data from the identification tag: the unique identifier, the OTP, and the address;
2) transmits the unique identifier, the OTP, and a current time stamp to a server identified by the address by sending a TCP/IP communication over the communications network;
3) responsive to sending the TCP/IP communication, receiving, over the communications network, a second data packet including a second address;
4) sending another TCP/IP communication over the communications network to the server identified by the second address; and
5) displaying data received from the second address, wherein said data includes a verification message;
a database including one or more object records, wherein each object record includes a unique identifier for a specific object;
the server comprising a network connection device communicatively coupled with a communications network, and a processor that:
1) receives the unique identifier, the OTP, and the current time stamp from the reader via the communications network;
2) accesses an object record in the database that corresponds to the unique identifier, and logs the unique identifier, the OTP, and the current time stamp in association with the object record;
3) determines whether the unique identifier and the OTP are verified against the unique identifier in the object record; and
4) if said unique identifier and the OTP are verified, then generates the second address and transmits said second address to the reader over the communications network, wherein the second address includes a verification message.

4. The system of claim 3, wherein the address is a uniform resource locator (URL).

5. A system for verifying both identification and presence of an object, the system comprising:
an identification tag associated with a single object, the identification tag comprising: a) an embedded integrated circuit that generates a one-time-password (OTP) upon each use of the identification tag, and b) non-volatile memory that stores a unique identifier, and a uniform resource locator (URL);
a reader comprising a mobile computing device including: a) a Near Field Communication (NFC) sub-system that reads data from the identification tag using radio frequency signals; b) a network connection device communicatively coupled with a communications network; and c) a processor that:
1) reads the following data from the identification tag: the unique identifier, the OTP, and the URL;
2) activates a web browser to navigate to the URL, and transmits the unique identifier, and the OTP to a server over the communications network;
3) responsive to navigating to the URL, receives, over the communications network, a second URL;
4) activates a web browser to navigate to the second URL; and
5) displays data received from the second URL, wherein said data includes a verification message;
a database including one or more object records, wherein each object record includes a unique identifier for a specific object;
the server comprising a network connection device communicatively coupled with a communications network, and a processor that:
1) receives the unique identifier, and the OTP from the reader via the communications network;
2) accesses an object record in the database that corresponds to the unique identifier, and logs the unique identifier, and the OTP in association with the object record;
3) determines whether the unique identifier and the OTP are verified against the unique identifier in the object record; and
4) if said unique identifier and the OTP are verified, then generates the second URL and transmits said second URL to the reader over the communications network, wherein a web page located at the second URL includes a verification message.

* * * * *